United States Patent
Li et al.

(10) Patent No.: US 12,518,551 B2
(45) Date of Patent: *Jan. 6, 2026

(54) METHOD AND RELATED DEVICE FOR BOARD WRITING EXTRACTION

(71) Applicant: Beijing ESWIN Computing Technology Co., Ltd., Beijing (CN)

(72) Inventors: Weiqi Li, Beijing (CN); Wei Hu, Beijing (CN); Gaosheng Wang, Beijing (CN); Nan Jing, Beijing (CN); Yuandong Huang, Beijing (CN); Andy Zhou, Beijing (CN)

(73) Assignee: Beijing ESWIN Computing Technology Co., Ltd., Beijing (CN)

( * ) Notice: Subject to any disclaimer, the term of this patent is extended or adjusted under 35 U.S.C. 154(b) by 365 days.

This patent is subject to a terminal disclaimer.

(21) Appl. No.: 18/163,389

(22) Filed: Feb. 2, 2023

(65) Prior Publication Data

US 2023/0351786 A1 Nov. 2, 2023

(30) Foreign Application Priority Data

Apr. 29, 2022 (CN) .......................... 202210471911.7

(51) Int. Cl.
*G06V 30/00* (2022.01)
*G06V 10/82* (2022.01)
(Continued)

(52) U.S. Cl.
CPC ............ *G06V 30/333* (2022.01); *G06V 10/82* (2022.01); *G06V 30/148* (2022.01)

(58) Field of Classification Search
CPC .... G06V 30/333; G06V 10/82; G06V 30/148; G06V 30/164; G06V 30/15;
(Continued)

(56) References Cited

U.S. PATENT DOCUMENTS

2020/0221849 A1* 7/2020 Lin .......................... A45D 29/00

FOREIGN PATENT DOCUMENTS

CN 109118509 A 1/2019
CN 109978889 A * 7/2019
(Continued)

OTHER PUBLICATIONS

Hinkle et al, Fast image segmentation for some machine vision applications, ICASSP '87. IEEE International Conference on Acoustics, Speech, and Signal Processing, vol. 12, pp. 233-236 (Year: 1987).*

(Continued)

*Primary Examiner* — Xiao Liu
(74) *Attorney, Agent, or Firm* — Westman, Champlin & Koehler, P.A.

(57) ABSTRACT

A board-writing extraction method and a related device are provided. The board writing extraction method includes: obtaining a target object segmentation image of a writing-board image, wherein a contrast ratio between a target object and a non-target object in the target object segmentation image reaches a predetermined contrast ratio; converting, according to the target object segmentation image, a grayscale image of the writing-board image into a to-be-processed grayscale image with the board writing being highlighted; and performing binarization processing on the to-be-processed grayscale image to obtain a board-writing image of the writing-board image. The described method and related device can effectively reduce the noise in the board-writing image extracted from the writing-board image.

14 Claims, 5 Drawing Sheets

(51) Int. Cl.
*G06V 30/148* (2022.01)
*G06V 30/32* (2022.01)

(58) Field of Classification Search
CPC .................. G06T 3/4038; G06T 5/50; G06T 2207/20036; G06T 2207/20224; G06T 5/70; G06T 5/73; G06T 5/90
See application file for complete search history.

(56) References Cited

FOREIGN PATENT DOCUMENTS

| | | | | |
|---|---|---|---|---|
| CN | 113688838 | A | 11/2021 | |
| CN | 114072850 | A * | 2/2022 | ......... G06K 9/00228 |
| CN | 114202601 | A | 3/2022 | |
| CN | 114283156 | A | 4/2022 | |
| CN | 114943663 | A | 8/2022 | |
| CN | 114945107 | A | 8/2022 | |
| WO | 2019232852 | A1 | 12/2019 | |

OTHER PUBLICATIONS

Saxena et al, Removing occlusion using even odd interlacing for efficient class room teaching, 2015 Eighth International Conference on Contemporary Computing (IC3), pp. 389-392) (Year: 2015).*
Copy and Translation of Chinese Office Action for Chinese Patent Application No. 2022104719117, filed Apr. 29, 2022, dated Mar. 28, 2025, 36 pages.
"Multi-feature Watershed Image Segmentation for Slope Geological Disaster Extraction" by Zhang Mingmei, edited by Pin Hong, China University of Mining and Technology Press, 4 pages.
"Parallel Robot Control Technology and Engineering Project-based Case Tutorial", Edited by Huang Jicai.—Beijing: Mechanical Industry Press, Sep. 2021, 7 pages.
"Deep Practice in OCR: Text Recognition Based on Deep Learning" by Liu Shuchun et al.—Beijing: Mechanical Industry Press, Apr. 2020. Intelligent Systems and Technology Series, 6 pages.
Xu Shumei, "Research on Weak Signal Detection and Nondestructive Testing Technology", Changsa; Hunan Science and Technology Press, Jul. 2021, 4 pages.

* cited by examiner

METHOD AND RELATED DEVICE FOR BOARD WRITING EXTRACTION

CROSS-REFERENCE TO RELATED APPLICATION

The present application claims priority to a Chinese patent application No. 202210471911.7, filed on Apr. 29, 2022, entitled "METHOD AND RELATED DEVICE FOR BOARD WRITING EXTRACTION", published as CN114863436A on Aug. 5, 2022, which is incorporated herein by reference in its entirety.

FIELD OF TECHNOLOGY

The present disclosure relates to a field of video processing technology, and in particular, to a method and a related device for board writing extraction.

BACKGROUND

With the popularity of online education, teaching video has become an indispensable type of educational resource. The teaching video is a video taken in a teaching scene by use of a camera equipment. In the teaching scene, a teacher may occlude board writing due to teaching needs, so it is necessary to perform board-writing completion process on an image frame of the teaching video, wherein extracting the board writing from the image frame is an indispensable step. However, in the teaching scene, light distribution on a writing board may be uneven, writings may be light or hard in different degrees, a writing board may not be cleaned up, and some other situations may occur, thus the board writing extracted from the image frame may be unclear, incomplete, or invalid.

SUMMARY

To solve the foregoing technical problems, an objective of the present disclosure is to provide a method and a related device for board writing extraction.

According to a first aspect of the present disclosure, a method for board writing extraction is provided, and comprises:
  obtaining a target object segmentation image of a writing-board image, wherein a contrast ratio between a target object and a non-target object in the target object segmentation image reaches a predetermined contrast ratio;
  converting, according to the target object segmentation image, a grayscale image of the writing-board image into a to-be-processed grayscale image with board writing being highlighted; and
  performing binarization processing on the to-be-processed grayscale image to obtain a board-writing image of the writing-board image.

In some embodiments, step of performing binarization processing on the to-be-processed grayscale image to obtain the board-writing image of the writing-board image comprises:
  dividing the to-be-processed grayscale image into a plurality of region blocks;
  determining, according to a weighted sum of all pixel values in one of the plurality of region blocks, a binarization threshold value of said one of the plurality of region blocks, and obtaining a binary image of said one of the plurality of region blocks by using the determined binarization threshold value; and
  splicing the binary images of all of the plurality of region blocks to form the board-writing image.

In some embodiments, each one of the plurality of region blocks comprises N rows and M columns of pixel units, where N and M are odd numbers, respectively; and
  the weighted sum of all pixel values in said one of the plurality of region blocks is a Gaussian weighted sum of all pixel values in said one of the plurality of region blocks.

In some embodiments, step of determining, according to the weighted sum of all pixel values in said one of the plurality of region blocks, the binarization threshold value of said one of the plurality of region blocks comprises:
  determining a sum of the weighted sum of all pixel values in said one of the plurality of region blocks and a threshold constant value as the binarization threshold value of said one of the plurality of region blocks.

In some embodiments, step of converting, according to the target object segmentation image, the grayscale image of the writing-board image into the to-be-processed grayscale image with the board writing being highlighted comprises:
  performing an image operation on the target object segmentation image and the writing-board image to obtain a to-be-processed writing-board image with the target object being identified in grayscale;
  performing gray-scaling processing on the non-target object in the to-be-processed writing-board image; and
  performing, according to a color board type of a writing board, grayscale adjustment on the non-target object, which is obtained after the gray-scaling processing, in the to-be-processed writing-board image, so as to obtain the to-be-processed grayscale image with the board writing being highlighted in grayscale.

In some embodiments, step of converting, according to the target object segmentation image, the grayscale image of the writing-board image into the to-be-processed grayscale image with the board-writing being highlighted comprises:
  obtaining a processed grayscale image of the writing-board image according to the target object segmentation image, wherein a grayscale value of the target object in the processed grayscale image of the writing-board image is consistent to a grayscale value of the writing board;
  performing morphological closing operation on the processed grayscale image of the writing-board image to obtain a writing-board background grayscale image; and
  performing image subtraction on the processed grayscale image of the writing-board image and the writing-board background grayscale image to obtain the to-be-processed grayscale image.

In some embodiments, step of obtaining the processed grayscale image of the writing-board image according to the target object segmentation image comprises:
  performing an image operation on the target object segmentation image and the writing-board image to obtain a to-be-processed writing-board image with the target object being identified in grayscale;
  performing gray-scaling processing on the to-be-processed writing-board image; and
  adjusting a grayscale value of the target object, which is obtained after the gray-scaling processing, in the to-be-processed writing-board image as a grayscale value of a writing board, so as to obtain a processed grayscale image of the writing-board image.

In some embodiments, the method further comprises: performing sharpening enhancement and edge smoothing on a character in an image obtained through the image subtraction, and determining the image obtained after the sharpening enhancement and the edge smoothing as the to-be-processed grayscale image.

In some embodiments, step of performing binarization processing on the to-be-processed grayscale image to obtain the board-writing image of the writing-board image comprises:
  determining the binarization threshold value through Otsu method; and
  performing binarization processing on the to-be-processed grayscale image by using the determined binarization threshold value, so as to obtain the board-writing image.

In some embodiments, step of converting, according to the target object segmentation image, the grayscale image of the writing-board image into the to-be-processed grayscale image with the board writing being highlighted comprises:
  performing an image operation on the target object segmentation image and the writing-board image to obtain the to-be-processed writing-board image with the target object being identified in grayscale;
  performing, according to a color board type of a writing board, grayscale adjustment on the target object in the to-be-processed writing-board image, so as to obtain a pre-processed image, wherein a contrast ratio between the target object and the board writing in the pre-processed image reaches the predetermined contrast ratio; and
  inputting the pre-processed image into a board-writing segmentation model and outputting the to-be-processed grayscale image by using the board-writing segmentation model, wherein the board-writing segmentation model is a neural network with a board-writing segmentation function after training and learning.

In some embodiments, the board-writing segmentation model is configured to perform following operations:
  extracting preliminary feature information from the pre-processed image;
  processing the preliminary feature information by using a plurality of expansive convolution layers with different expansive ratios to obtain a plurality of pieces of structure feature information, wherein the plurality of pieces of structure feature information are in one-to-one correspondence with the plurality of expansive convolution layers;
  performing information confluence on the plurality of pieces of structure feature information to obtain intermediate information; and
  performing image reconstruction according to the intermediate information to obtain the to-be-processed grayscale image.

In some embodiments, the method further comprises: obtaining an external contact contour of the board-writing image and filling a target region with a writing-board color in the board-writing image, wherein the target region is a region which is located inside the external contact contour and has an area smaller than a preset area.

In some embodiments, the method further comprises: performing noise filtering on an edge of the target object in the writing-board image.

According to a second aspect of the present disclosure, an electronic device is provided, and comprises: a processor, a memory, and a program which is stored in the memory and executable by the processor, wherein the program is configured to realize a step of any one of the methods according to the first aspect, when the program is executed by the processor.

According to a third aspect of the present disclosure, a computer-readable storage medium is provided, and has a computer program or an instruction stored thereon, wherein the computer program or the instruction is configured to realize a step of any one of the methods according to the first aspect, when the computer program or the instruction is executed by a processor.

The present disclosure may have following advantages:

In the method for board-writing extraction according to embodiments of the present disclosure, a grayscale image of the writing-board image is converted, according to a target object segmentation image, into a to-be-processed grayscale image with the board writing being highlighted, therefore a board-writing image, which comprises clear and complete board writing without invalid writing, of the writing-board image may be obtained by performing binarization processing on the to-be-processed grayscale image. That is, noise in the board-writing image extracted from the writing-board image can be reduced.

It should be noted that the general descriptions above and detailed descriptions below are only illustrative and explanatory and do not limit the present disclosure.

BRIEF DESCRIPTION OF THE DRAWINGS

In order to explain technical solutions according to the embodiments of the present disclosure more clearly, drawings corresponding to the embodiments of the present disclosure are briefly introduced below, wherein.

DESCRIPTION OF THE EMBODIMENTS

To facilitate understanding the present disclosure, a more comprehensive description of the present disclosure is provided below with reference to the accompanying drawings.

Preferred embodiments of the present disclosure are provided in the accompanying drawings. However, the present disclosure can be implemented in different forms and is not limited to the embodiments described here. On the contrary, an objective of providing these embodiments is to provide a more thorough understanding of the disclosed content of the present disclosure.

Figure 1:
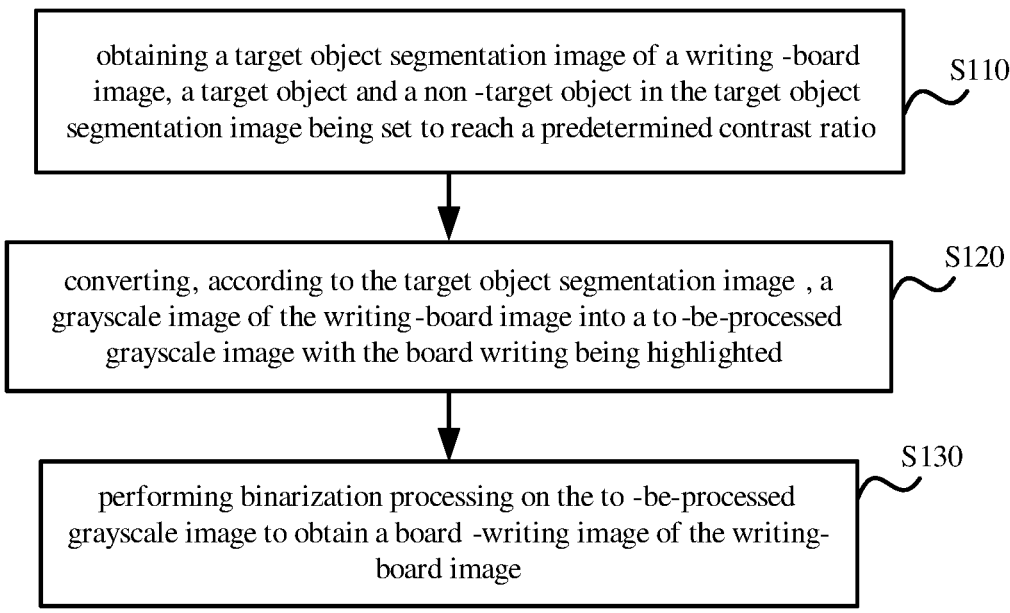
FIG. 1 is a flowchart of a method for board writing extraction according to an embodiment of the present disclosure.

FIG. 1 is a flowchart of a method for board-writing extraction according to an embodiment of the present disclosure. Referring to FIG. 1, the method for board-writing extraction comprises following steps.

In step S110, a target object segmentation image of a writing-board image is obtained, wherein a contrast ratio between a target object and a non-target object in the target object segmentation image reaches a predetermined contrast ratio.

Specifically, the writing-board image is a writing-board region of an image frame in a video, only includes a valid region which can be written on the writing board, and not includes borders of a writing board. In this case, only the writing-board region without writing, the writing, and the target object occluding the writing board are included in the writing-board image.

Figure 2:
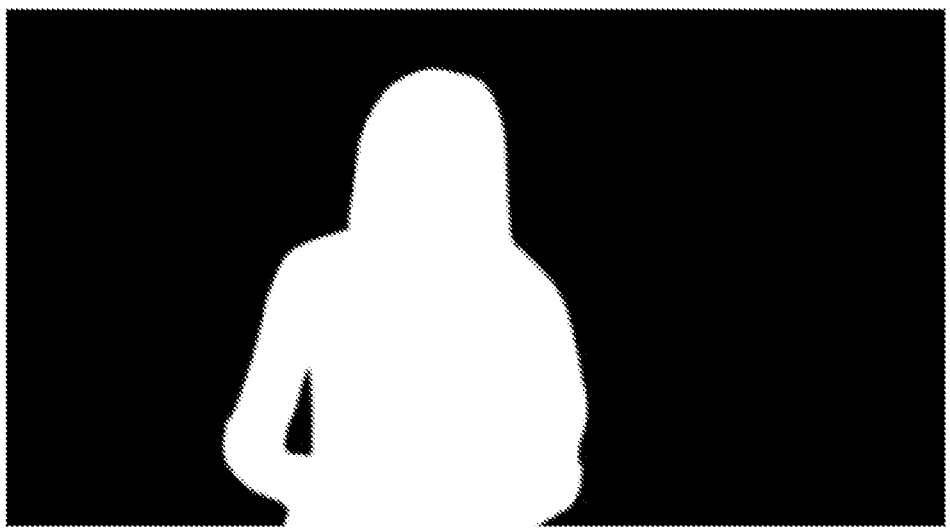
FIG. 2 is a schematic diagram of a portrait mask according to an embodiment of the present disclosure.

The video is taken in a scene comprising a writing board, for example, the video may be a teaching video obtained by photographing a teaching scene, and in this case, the target object is usually a teacher. The target object segmentation image is obtained for distinguishing the target object and the non-target object in the writing-board image by using different pixel values, therefore, the contrast ratio between the target object and the non-target object in the target object segmentation image need to reach the predetermined contrast ratio, and the target object segmentation image and the writing-board image have a same size. FIG. 2 is a schematic diagram of an exemplary target object segmentation image obtained after performing inverse operation on a portrait mask, which has a portrait region shown by pure white pixels, and a non-portrait region shown by pure black pixels.

In step S120, a grayscale image of the writing-board image is converted, according to the target object segmentation image, into a to-be-processed grayscale image with the board writing being highlighted.

It should be noted that, only the writing-board region without writing, the writing, and the target object occluding the writing board are included in the writing-board image, and in practical, there is a relatively obvious contrast ratio between the writing board and the writing. Therefore, as long as the contrast ratio between the target object and the writing in the grayscale image of the writing-board image is set to reach the predetermined contrast ratio according to the target object segmentation image, the foregoing to-be-processed grayscale image with the board writing being highlighted can be obtained.

In step S130, binarization processing is performed on the to-be-processed grayscale image to obtain a board-writing image of the writing-board image.

Specifically, the writing portion and the non-writing portion in the board-writing image can be distinguished by different pixel values, and therefore, the writing can be presented.

The board writing in the to-be-processed grayscale image can be relatively highlighted, so that a grayscale value, which is between a grayscale value of the writing and a grayscale value of the writing board and between a grayscale value of the writing and a grayscale value of the target object, can be determined, and then the determined grayscale value can be used as a binarization threshold value to obtain the foregoing board-writing image.

The foregoing steps of method for board writing extraction are described in details below.

Figure 3:
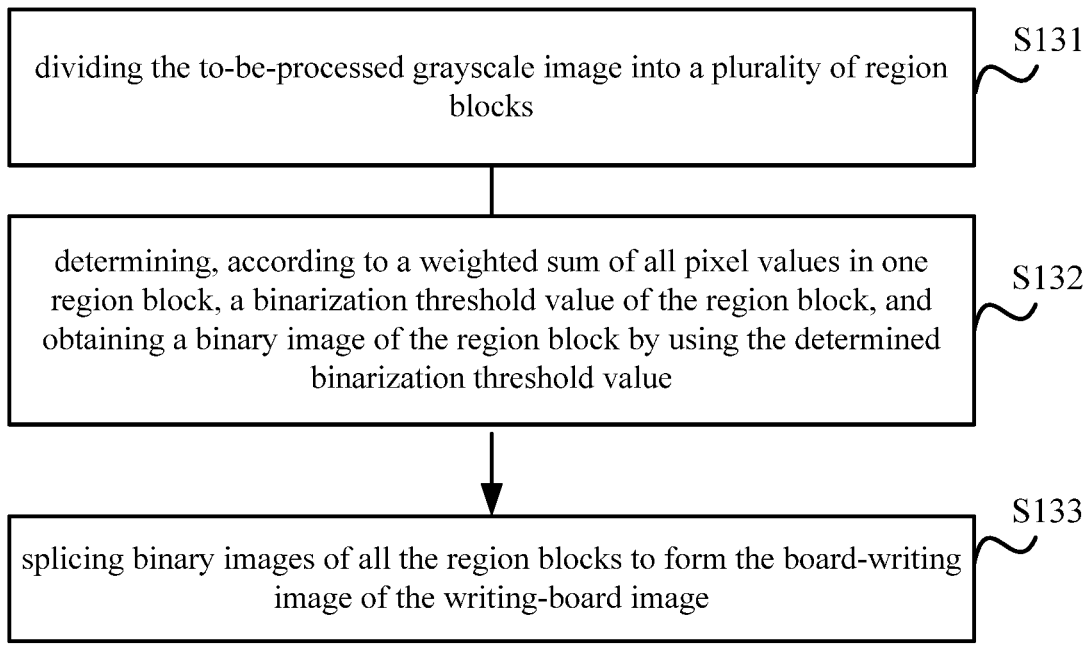
FIG. 3 is a flowchart of a method for performing binarization processing on a to-be-processed grayscale image according to an embodiment of the present disclosure.

FIG. 3 is a flowchart of a method for performing binarization processing on a to-be-processed grayscale image according to an optional embodiment. As shown in FIG. 3, in step S130, the performing binarization processing on the to-be-processed grayscale image includes the following steps.

Step S131, dividing the to-be-processed grayscale image into a plurality of region blocks.

It should be noted that, the plurality of region blocks may have the same or different sizes. The size of the region block described herein only refers to the rows and columns of the pixel unit included in the region block.

For example, the to-be-processed grayscale image may be divided into a plurality of region blocks according to a preset size N*M. Specifically, the step may include: dividing region blocks of N*M successively in the first N row, and if the number of the columns of the to-be-processed grayscale image is not an integer multiple of M, enable the last region block divided from the first N row is not the M column. Then, region blocks are divided from the subsequent plurality of N rows in the same method. If the quantity of rows of the to-be-processed grayscale image is not an integer multiple of N, the region blocks are divided from rows in to-be-processed grayscale image, and the quantity of the rows is less than N.

Step S132, determining, according to a weighted sum of all pixel values in one region block, a binarization threshold value of the region block, and obtaining a binary image of the region block by using the determined binarization threshold value.

Specifically, as to the weighted sum of all the pixel values in the region block, it may be that weights of all the pixel values are the same to enable the obtained weighted sum is an average value of all the pixel values, and it may further be that the weights of all the pixel values are different, and the weighted sum may be a Gaussian weighted sum obtained by determining the weights of all the pixel values through a Gaussian function.

If a weighted sum of all pixel values in one region block is a Gaussian weighted sum, a closer distance between the pixel unit and the center of the region block indicates a heavier weight of the pixel unit. Therefore, the weighted sum relies more on pixel features of the center of the region block and less on pixel features adjacent to other region blocks. It is beneficial to determining a binarization threshold value with relatively high reference value.

Further, a binarization threshold value of a region block is determined according to a weighted sum of all pixel values in the region block. A sum of a weighted sum of all pixel values in one region block and a threshold value constant may be determined as a binarization threshold value of the region block. The threshold value constant plays a role of calibration, so that the finally determined binarization threshold value can accurately distinguish the writing and non-writing in the to-be-processed grayscale image. The threshold constant value may be set to positive or negative depending on the situation.

Step S133, splicing binary images of all the region blocks to form the board-writing image of the writing-board image.

It should be noted that, binary images of all the region blocks in step S132 all use the same pixel value to identify the writing and the non-writing. For example, the pixel value 0 is used to identify the writing and the pixel value 255 is used to identify the non-writing. That is, the binary image of each region block is an image with writing in black and background in white.

Specifically, the binary images of all the region blocks are spliced according to positions of the region blocks in the to-be-processed grayscale image. That is, a sequence of splicing the binary images is consistent to a sequence of the corresponding region blocks in the to-be-processed grayscale image. Finally, the obtained board-writing image of the writing-board image and the writing-board image have the same size.

In practical, the process of performing binarization processing on the to-be-processed grayscale image may be implemented by invoking a local adaptive binarization function. That is, the to-be-processed grayscale image is used as an input variable of the local adaptive binarization function. After a first parameter and a second parameter required for the local adaptive binarization function are set, the foregoing step S131 to step S133 may be implemented by using the local adaptive binarization function to obtain the board-writing image. The first parameter is used for specifying sizes of the region blocks, that is, the foregoing M and N. The second parameter is used for specifying the foregoing threshold value constant.

The local adaptive binarization function is shown as formula (1): $I_{dst}$ represents the board-writing image of the writing-board image, $f_{local\_adaptive\_binarization}$ represents the local adaptive binarization function, $I_{src}$ represents the to-be-processed grayscale image, blockSize represents the first parameter, and C represents the second parameter.

$$I_{dst}=f_{local\_adaptive\_binarization}(I_{src},blockSize,C) \quad (1)$$

For example, when performing step S132, the local adaptive binarization function uses the Gaussian weighted sum as the weighted sum. In formula (1), blockSize=11 and C=−10, and the local adaptive binarization function shown in formula (1) divides the to-be-processed grayscale image into region blocks in sizes of 11*11 (pixel as unit) in step S131, and subtracts 11 from the calculated Gaussian weighted sum to obtain the binarization threshold value in step S132.

Figure 4:
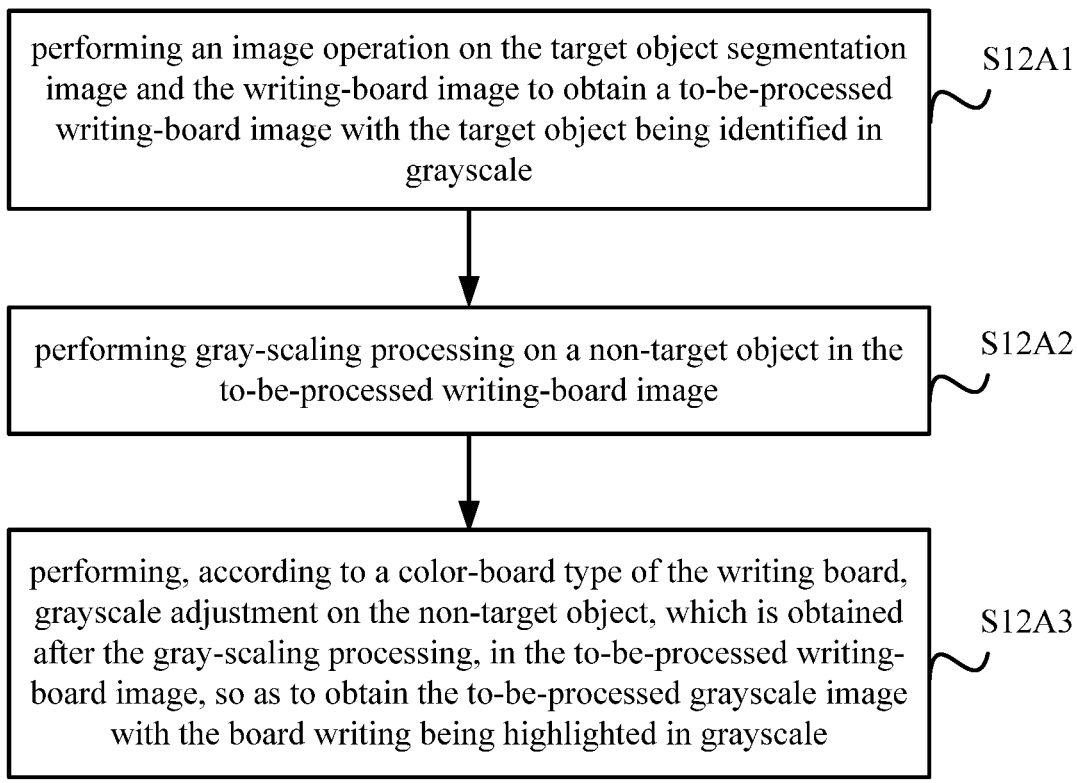
FIG. 4 is a flowchart of a method for converting a grayscale image of a writing-board image into a to-be-processed grayscale image according to an embodiment of the present disclosure.

FIG. 4 shows an optional method for obtaining a to-be-processed grayscale image with a board writing being highlighted in the embodiment. It is to be understood that, the to-be-processed grayscale image may alternatively be obtained by using other method than the method shown in FIG. 4.

Referring to FIG. 4, step S120 of converting, according to the target object segmentation image, a grayscale image of the writing-board image into a to-be-processed grayscale image with the board writing being highlighted includes following steps.

Step S12A1, performing an image operation on the target object segmentation image and the writing-board image to obtain a to-be-processed writing-board image with the target object being identified in grayscale.

It should be noted that, the target object is identified by using grayscale, that is, a pixel value of the target object region is a single-channel grayscale value.

For example, the target object in the target object segmentation image is black and the non-target object is white. Image phase operation is performed on the target object segmentation image and the writing-board image. Therefore, compared with the writing-board image, only the target object region in the to-be-processed writing-board image is changed, that is, the target object region in the to-be-processed writing-board image is black.

Step S12A2, performing gray-scaling processing on a non-target object in the to-be-processed writing-board image.

It is to be noted that, the target object in the to-be-processed writing-board image is already identified by using grayscale, so that the gray-scaling processing may be implemented on the entire to-be-processed writing-board image. Gray-scaling processing is performed on the entire to-be-processed writing-board image, but the grayscale value of the target object in the to-be-processed writing-board image is not changed.

Step S12A3, performing, according to a color board type of the writing board, grayscale adjustment on the non-target object, which is obtained after the gray-scaling processing, in the to-be-processed writing-board image, so as to obtain the to-be-processed grayscale image with the board writing being highlighted in grayscale.

Specifically, in a case that the writing board is a first type of color board, the to-be-processed grayscale image is a to-be-processed writing-board image obtained after gray-scaling processing in step S12A2. That is, in step S12A3, grayscale adjustment does not need to be performed on the non-target object after gray-scaling processing in the to-be-processed writing-board image. In a case that the writing board is a second type of color board, image inverse operation is performed on the non-target object after gray-scaling processing in the to-be-processed writing-board image, so as to obtain the to-be-processed grayscale image.

It is to be noted that, the grayscale value of the first type of color board is similar to the grayscale value of the target object in the to-be-processed writing-board image. There is an obvious contrast ratio between a grayscale value of the writing on this type of color board and a grayscale value of the target object in the to-be-processed writing-board image. There is an obvious contrast ratio between a grayscale value of the second type of color board and a grayscale value of the target object in the to-be-processed writing-board image. The grayscale value of the writing on this type of color board is similar to the grayscale value of the target object in the to-be-processed writing-board image. The grayscale value of the first type of color board refers to a grayscale value of a grayscale image of the first type of color board. The grayscale value of the second type of color board and the grayscale value of the writing can be understood similarly.

For example, the grayscale value of the target object in the to-be-processed writing-board image is 0, and the first type of color board may be a writing board with a grayscale value less than a grayscale threshold value, and the second type of color board is a writing board with a grayscale value greater than the grayscale threshold value. The grayscale threshold value may be 127 or 128. In this case, the first type of color board and the second type of color board are respectively a dark color board and a light color board. For example, blackboard and greenboard are common dark color boards, and whiteboard is a common light color board.

In an embodiment of the present disclosure, a binarization threshold value of a region block is determined according to a weighted sum of all pixel values in that region block. That is, the binarization threshold value is obtained through a local adaptive method. In a real scenario, different regions on the writing board not only have different proportions of writing, but may also have uneven light distribution of light and different weights (light/heavy) of writing. The binarization threshold value obtained through the local adaptive method can solve the problem of inaccurate extraction caused by uneven light distribution and different weights of writing.

Figure 5:
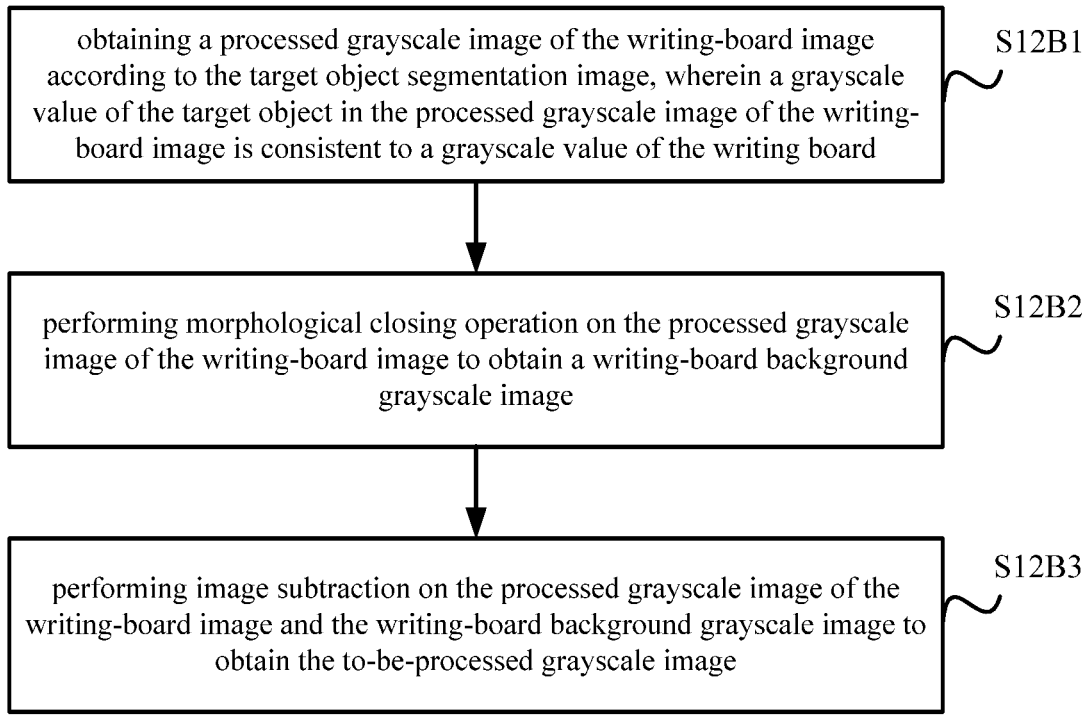
FIG. 5 is a flowchart of another method for converting a grayscale image of a writing-board image into a to-be-processed grayscale image according to an embodiment of the present disclosure.

FIG. 5 shows another optional method for converting a grayscale image of a writing-board image into a to-be-processed grayscale image. Referring to FIG. 5, in another optional embodiment in the present disclosure, step S120 of converting, according to the target object segmentation image, a grayscale image of the writing-board image into a to-be-processed grayscale image with the board writing being highlighted includes following steps.

Step S12B1, obtaining a processed grayscale image of the writing-board image according to the target object segmentation image, wherein a grayscale value of the target object in the processed grayscale image of the writing-board image is consistent to a grayscale value of the writing board.

Specifically, it may be shown in step S12A1, first performing image operation on the target object segmentation image and the writing-board image to obtain a to-be-processed writing-board image with the target object being identified in grayscale; then performing gray-scaling processing on the to-be-processed writing-board image, similarly, the grayscale value of the target object in the to-be-processed writing-board image is not changed during the gray-scaling processing; and further, adjusting the grayscale value of the target object, which is obtained after the gray-scaling processing, in the to-be-processed writing-board image as a grayscale value of the writing board, so as to obtain a processed grayscale image of the writing-board image.

For the to-be-processed writing-board image after the gray-scaling processing, a grayscale histogram thereof may be obtained first. A grayscale histogram is a function of a grayscale value, which represents a quantity of pixel units having grayscale values in the to-be-processed writing-board image after the gray-scaling processing. After gray-scaling processing, the proportion of the target object and the proportion of the writing board are usually larger than the proportion of the writing in the to-be-processed writing-board image. Therefore, the grayscale value of the writing board has the most pixel units in all grayscale values other than the target object grayscale value in the grayscale histogram. Based on this, the grayscale value of the writing board may be determined from the to-be-processed writing-board image after gray-scaling processing.

Step S12B2, performing morphological closing operation on the processed grayscale image of the writing-board image to obtain a writing-board background grayscale image.

Specifically, if a writing board is a dark color board, image inverse operation is first performed on a processed grayscale image of the writing-board image, and then morphological closing operation is performed on the obtained image. In this case, the writing board and the target object may be used as light color parts in an image operated by morphological closing operation, so as to be used as an operation target in the morphological closing operation. If the writing board is a light color board, the writing board and the target object are already the light color parts in the image, so that morphological closing operation is directly performed on the processed grayscale image of the writing-board image.

The morphological closing operation is an operation of first expansion operation and then corrosion operation. The writing on the writing board is relatively thin, and the writing board and the target object are used as an operation target of the morphological closing operation. Therefore, small black holes formed by writing within the operation target can be eliminated, and a writing-board background grayscale image without writing is obtained.

Step S12B3, performing image subtraction on the processed grayscale image of the writing-board image and the writing-board background grayscale image to obtain the to-be-processed grayscale image.

Specifically, subtraction is performed on pixel values of corresponding pixel points of the processed grayscale image of the writing-board image and the writing-board background grayscale image, and an absolute value of the subtraction difference is a pixel value of a pixel point of a corresponding position in the to-be-processed grayscale image. Because the writing-board background grayscale image is obtained by eliminating writing on the processed grayscale image of the writing-board image, the writing can be presented on the to-be-processed grayscale image.

Further, sharpening enhancement and edge smoothing may further be performed on a character in the image obtained through image subtraction in step S12B3, and the image obtained after sharpening enhancement and edge smoothing is determined as the to-be-processed grayscale image. In this case, the writing can be presented on the to-be-processed grayscale image completely.

It is to be noted that, when the writing board is clean and the light is even, the writing board only has one grayscale value. If the writing board is not clean or the light is uneven, the writing board has a plurality of grayscale values. The foregoing step of adjusting the grayscale value of the target object, which is obtained after the gray-scaling processing, in the to-be-processed writing-board image as a grayscale value of the writing board is only to adjust the grayscale value of the target object as one of a plurality of grayscale values corresponding to the writing board. Only a writing board is presented in the writing-board background grayscale image obtained in step S12B2, however, in a case that the writing board is not clean or the light is uneven, there may be more than one grayscale value. Therefore, compared with the step of obtaining a writing-board background grayscale image by assigning uniform grayscale values, a to-be-processed grayscale image obtained by performing the foregoing step S12B1 to step S12B3 can present the board-writing more accurately.

It is to be understood that, although the to-be-processed grayscale image obtained in step S12B3 can present writing, the writing regions are not usually presented in black and the non-writing regions are not usually presented in white. In view of this, a preferred binarization threshold value may be determined in step S130 through an Otsu method. Then, binarization processing is performed on the to-be-processed grayscale image by using the determined binarization threshold value, so as to obtain a board-writing image with obvious difference between a writing region and a non-writing region. For example, in the board-writing image, the writing region are in black and the non-writing region are in white.

Figure 6:
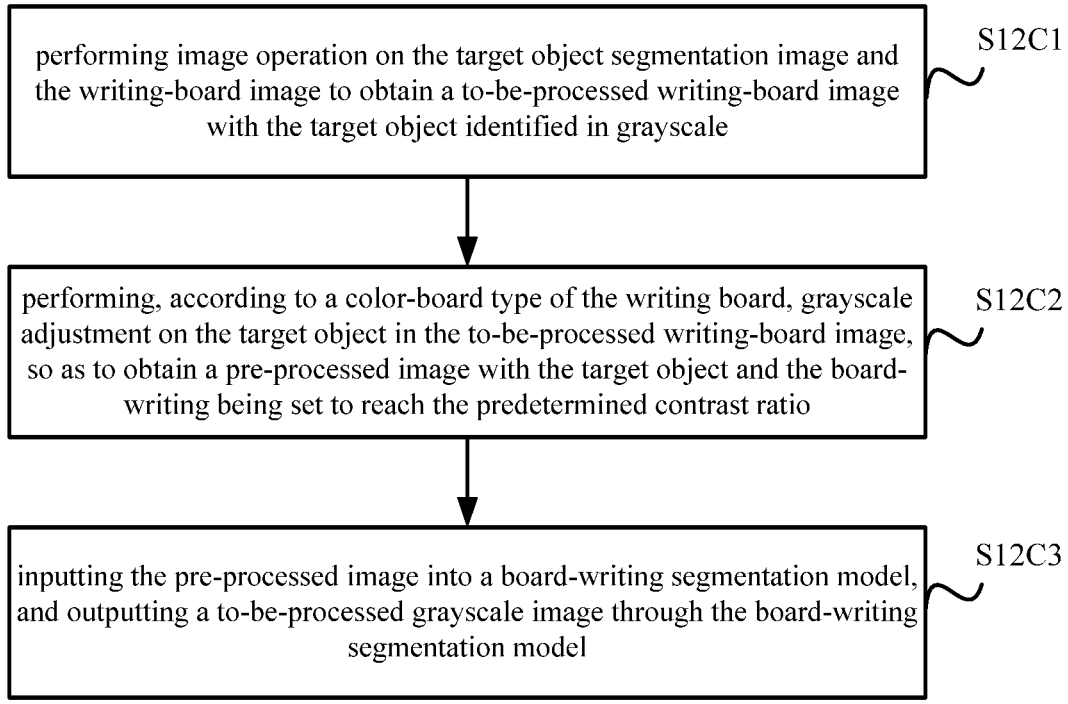
FIG. 6 is a flowchart of another method for converting a grayscale image of a writing-board image into a to-be-processed grayscale image according to an embodiment of the present disclosure.

FIG. 6 shows another optional method for converting a grayscale image of a writing-board image into a to-be-processed grayscale image. Referring to FIG. 6, in still another optional embodiment in the present disclosure, step S120 of converting, according to the target object segmentation image, a grayscale image of the writing-board image into a to-be-processed grayscale image with the board writing being highlighted includes following steps.

Step S12C1, performing an image operation on the target object segmentation image and the writing-board image to obtain a to-be-processed writing-board image with the target object being identified in grayscale.

Specifically, the process of step S12C1 is the same as the process of step S12A1, and details are not repeated herein again.

Step S12C2, performing, according to a color board type of the writing board, grayscale adjustment on the target object in the to-be-processed writing-board image, so as to obtain a pre-processed image with the target object and the board writing being set to reach the predetermined contrast ratio.

Specifically, in a case that the writing board is the first type of color board, the pre-processed image is a to-be-processed writing-board image obtained in step S12C1. That is, in step S12C2, grayscale adjustment does not need to be performed on the target object in the to-be-processed writing-board image. In a case that the writing board is the second type of color board, image inverse operation is performed on the target object in the to-be-processed writing-board image, so as to obtain the pre-processed image.

Step S12C3, inputting the pre-processed image into a board-writing segmentation model, and outputting a to-be-processed grayscale image through the board-writing segmentation model.

Specifically, the board-writing segmentation model may be a neural network having a board-writing segmentation function after training and learning, which can identify a writing no matter whether the writing is heavy or light. Therefore, light writing can be represented in the outputted to-be-processed grayscale image, resolving a problem of inaccurate board writing extraction caused by different weights (light/heavy) of writings.

Figure 7:
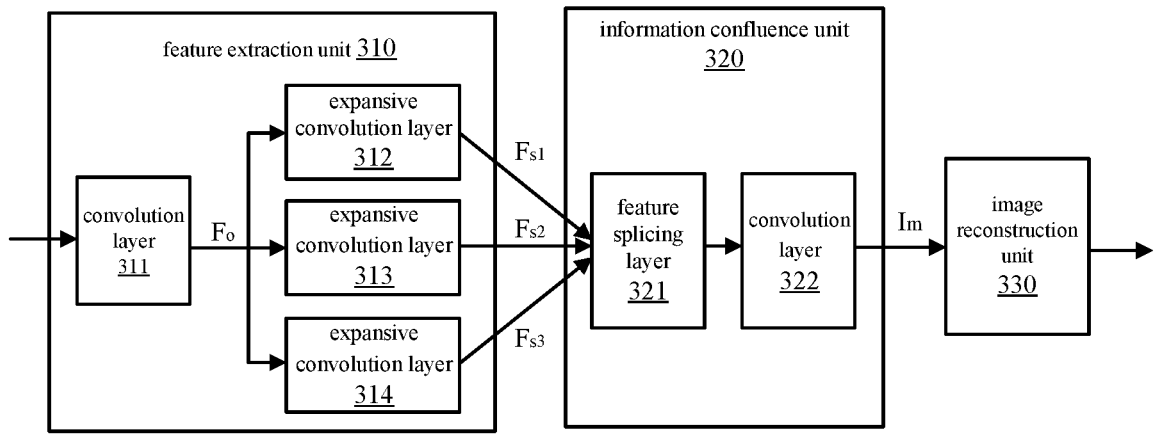
FIG. 7 is a diagram of a board-writing segmentation model according to an embodiment of the present disclosure.
Figure 8:
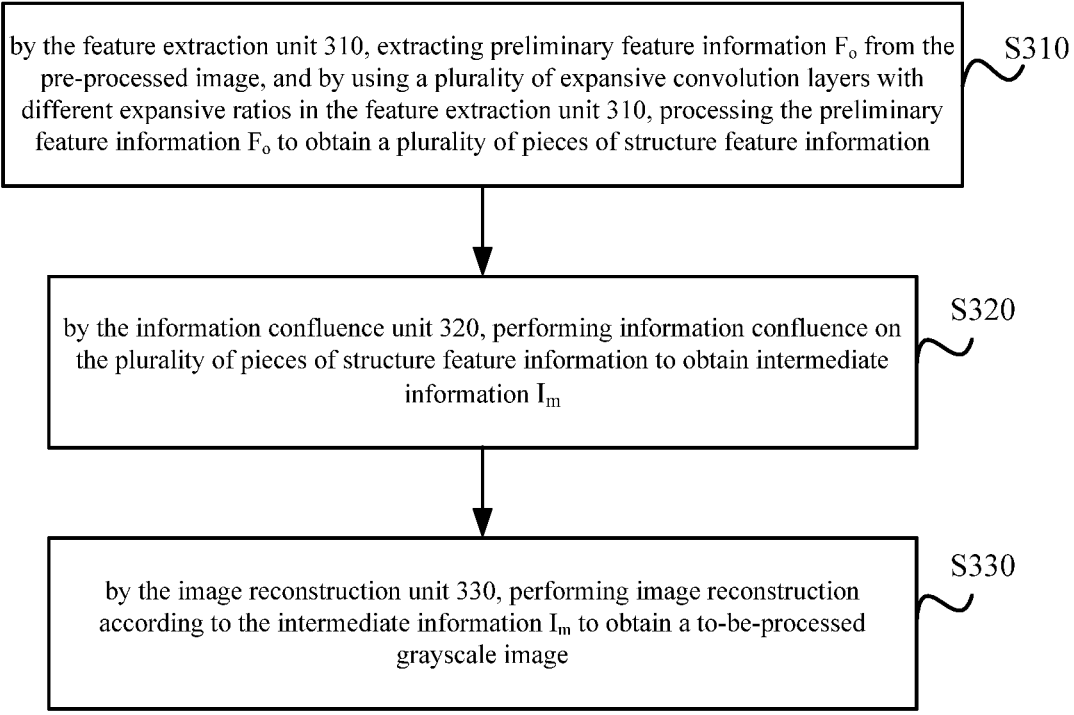
FIG. 8 is a schematic diagram of operations performed by a board-writing segmentation model according to an embodiment of the present disclosure.

FIG. 7 is a schematic structural diagram of a board-writing segmentation model. Referring to FIG. 7, a board-writing segmentation model 300 may include: a feature extraction unit 310, an information confluence unit 320, and an image reconstruction unit 330. Based on the board-writing segmentation model 300 shown in FIG. 7, the step of the board-writing segmentation model 300 outputting a to-be-processed grayscale image may be shown as FIG. 8, including:

Step S310, in which the feature extraction unit 310 extracts preliminary feature information $F_o$ from the pre-processed image. The preliminary feature information $F_o$ is processed by using a plurality of expansive convolution layers with different expansive ratios in the feature extraction unit 310 to obtain a plurality of pieces of structure feature information, where the plurality of pieces of structure feature information are in one-to-one correspondence with the expansive convolution layers.

Specifically, the feature extraction unit 310 may include a convolution layer 311 with a convolution kernel of 3 and a stride of 1, an expansive convolution layer 312 with a stride of 1 and an expansive ratio of 1, an expansive convolution layer 313 with a stride of 1 and an expansive ratio of 2, and an expansive convolution layer 314 with a stride of 1 and an expansive ratio of 3. The convolution layer 311 is configured to extract preliminary feature information $F_o$ from the pre-processed image, the convolution layer 312 is configured to process the preliminary feature information $F_o$ to obtain a structure feature $F_{s1}$, the convolution layer 313 is configured to process the preliminary feature information $F_o$ to obtain a structure feature $F_{s2}$, and the convolution layer 314 is configured to process the preliminary feature information $F_o$ to obtain a structure feature $F_{s3}$.

Step S320, in which the information confluence unit 320 performs information confluence on the plurality of pieces of structure feature information to obtain intermediate information $I_m$.

Specifically, the information confluence unit 320 may include a feature splicing layer 321 and a convolution layer 322 with a convolution kernel of 3 and a stride of 1. First, the feature splicing layer 321 splices a plurality of structure features and inputs a splicing result into the convolution layer 322 based on a channel dimension. The convolution layer 322 merges the plurality of pieces of structure feature information into the intermediate information $I_m$ based on the splicing result.

Step S330, in which the image reconstruction unit 330 performs image reconstruction according to the intermediate information $I_m$ to obtain a to-be-processed grayscale image.

Specifically, the image reconstruction unit 330 may include a convolution layer with a convolution kernel of 3 and a stride of 1. The convolution layer performs image reconstruction according to the intermediate information $I_m$ to obtain a single-channel to-be-processed grayscale image.

It is to be noted that, a writing portion and non-writing portion can be distinguished by using different grayscale values in the to-be-processed grayscale image, but a contrast ratio between the writing portion and the non-writing portion may not be obvious. Further, a board-writing image with a relatively obvious contrast ratio between the writing portion and the non-writing portion may be obtained through step S130, for example, in the board-writing image, the writing portion is black and the non-writing portion is white.

In the embodiment of the present disclosure, a plurality of expansive convolution layers with different expansive ratios process the preliminary feature information $F_o$, which enlarging the receptive field of the convolution layer and brings richer structural information. For a board-writing segmentation task for distinguishing the writing portion and the non-writing portion, because the character and graph has high requirement on segmentation precision, and the precision will be low due to the up-and-down sampling method. The board-writing segmentation model 300 provided according to the embodiment of the present disclosure can accurately segment the writing on the outputted to-be-processed grayscale image based on relatively rich structure information, so as to meet the precision requirement of the board-writing segmentation task.

A plurality of optional methods for obtaining a to-be-processed grayscale image in step S120 and obtaining a board-writing image in step S130 are provided in the foregoing plurality of embodiments. In practical, one of the methods may be selected to perform step S120 and step S130, so as to extract the board writing. In the foregoing plurality of embodiments, the to-be-processed writing-board image is obtained by using the same method (referring to related description in step S12A1 and step S12B1, and step S12C1). In this case, the computer program or instruction required for the realization of the method is more reusable.

Further, an operation of removing noise may further be performed after step S130.

For example, an external contact contour of the board-writing image is obtained, and a region which is located within the external contact contour and has an area smaller than a preset value is filled into a writing-board color in the board-writing image. This is mainly to eliminate small dots caused when the writing board is not clean or when a chalk mistakenly touches the writing board, and these small dots are invalid writing.

In another example, noise filtering and removing is performed from edge of a target object on the writing-board image. Specifically, the following operations may be performed: adjusting the writing region in the writing-board image as white and non-writing region as black; performing expansion on a target object mask (the non-target object part is black and the target object part is white), and performing image inverse operation on the target object mask after the expansion; and performing image multiple or phase operation on the board-writing image after the adjustment and the image obtained through image inverse operation. In this case, the writing which is in white and expands to the target object region in the adjusted board-writing image are all assigned in black, so as to filter and remove the edge noise of the target object.

It is to be understood that, the foregoing two operations for removing noise may be used independently or in combination. In a case of using in combination, a result of the foregoing noise removing operation is used as an object operated by the next noise removing operation.

Figure 9:
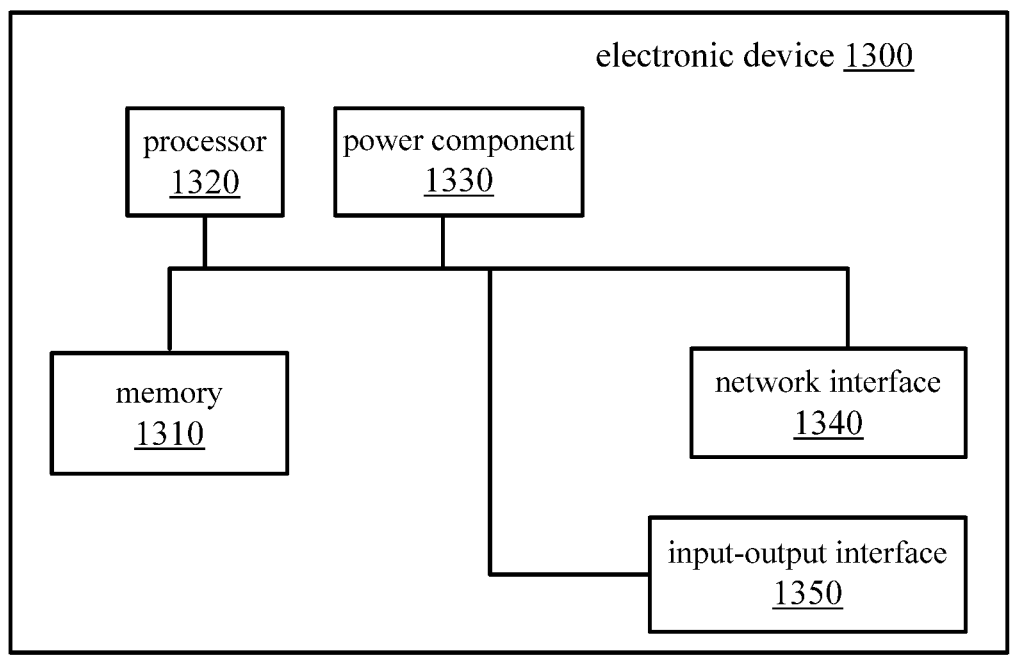
FIG. 9 is a schematic structural diagram of an electronic device according to an embodiment of the present disclosure.

An embodiment of the present disclosure further provides an electronic device 1300 as shown in FIG. 9, including a memory 1310, a processor 1320, and a program stored in the memory 1310 and capable of being executed by the processor 1320, where when executed by the processor 1320, the program enables the processes of the embodiments of the foregoing board writing extraction method, which can have the same technical effect. Certainly, the electronic device may further include a power component 1330, a network interface 1340, an input-output interface 1350, and other auxiliary sub-devices.

It is understood by persons of ordinary skills in the art that all or part of the steps in the various methods of the above embodiments may be accomplished by instructions, or by instructions controlling the associated hardware, stored in a computer-readable storage medium and loaded and executed by the processor. In view of this, an embodiment of the present disclosure further provides a computer-readable storage medium on which a computer program is stored. When the computer program is executed by the processor, each process of the embodiments in the board writing extraction method may be implemented. The computer-readable storage medium may be a medium such as USB flash drive, portable hard drive, Read-Only Memory (ROM), Random Access Memory (RAM), diskette or compact disc can store program code.

The program stored in the readable storage medium can perform steps in any board writing extraction method provided in the embodiments of the present disclosure. Therefore, the beneficial effect of any board writing extraction method provided in the embodiments of the present disclosure may be achieved. Reference may be made to the foregoing embodiments, and details are not repeated herein again. The specific implementation of the foregoing operations can be referred to the previous embodiments, and will not be repeated here.

It is to be noted that when describing each embodiment in this specification, it focuses on the differences with other embodiments, and the same or similar parts among embodiments can be referred to each other for understanding. For system embodiments, as they are basically similar to method embodiments, the relevant points can be referred to the description of the method embodiments section.

In addition, it is to be noted that in the disclosed devices and methods, it is obvious that the components or steps can be separated and/or recombined. Such decomposition and/or recombination shall be deemed to be the equivalent of the present disclosure. Also, the steps that perform the above series of processes can naturally be executed chronologically in the order described, but they do not necessarily have to be chronological, and some steps can be executed in parallel or independently of each other. All or any of the steps or components of the disclosed method and device can be understood by a person of ordinary skill in the art by means of hardware, firmware, software or a combination of them in any computing device (including a processor, a storage medium, etc.) or a network of computing devices. This is what person of ordinary skills in the art can achieve by reading the present disclosure and using their basic programming skills.

Finally, it should be noted that it is clear that the above embodiments are merely examples to clearly illustrate the present disclosure and are not limitations on implementations. For persons of ordinary skills in the art, other variations or variations can be made on the basis of the above description. It is not necessary and cannot be exhaustive here. Any apparent change or alteration arising therefrom remains within the scope of the present disclosure.

What is claimed is:

1. A method for board writing extraction, comprising:
   obtaining a target object segmentation image of a writing-board image, wherein a contrast ratio between a target object and a non-target object in the target object segmentation image reaches a predetermined contrast ratio;
   converting, according to the target object segmentation image, a grayscale image of the writing-board image into a to-be-processed grayscale image with board writing being highlighted; and
   performing binarization processing on the to-be-processed grayscale image to obtain a board-writing image of the writing-board image,
   wherein the step of performing binarization processing on the to-be-processed grayscale image to obtain the board-writing image of the writing-board image comprises:
   dividing the to-be-processed grayscale image into a plurality of region blocks;
   determining, according to a weighted sum of all pixel values in one of the plurality of region blocks, a binarization threshold value of said one of the plurality of region blocks, and obtaining a binary image of said one of the plurality of region blocks by using the determined binarization threshold value; and
   splicing the binary images of all of the plurality of region blocks to form the board-writing image.

2. The method according to claim 1, wherein
   each one of the plurality of region blocks comprises N rows and M columns of pixel units, where N and M are odd numbers, respectively; and
   the weighted sum of all pixel values in said one of the plurality of region blocks is a Gaussian weighted sum of all pixel values in said one of the plurality of region blocks.

3. The method according to claim 1, wherein step of determining, according to the weighted sum of all pixel values in said one of the plurality of region blocks, the binarization threshold value of said one of the plurality of region blocks comprises:
   determining a sum of the weighted sum of all pixel values in said one of the plurality of region blocks and a threshold constant value as the binarization threshold value of said one of the plurality of region blocks.

4. The method according to claim 1, wherein step of converting, according to the target object segmentation image, the grayscale image of the writing-board image into the to-be-processed grayscale image with the board writing being highlighted comprises:

performing an image operation on the target object segmentation image and the writing-board image to obtain a to-be-processed writing-board image with the target object being identified in grayscale;

performing gray-scaling processing on the non-target object in the to-be-processed writing-board image; and performing, according to a color board type of a writing board, grayscale adjustment on the non-target object, which is obtained after the gray-scaling processing, in the to-be-processed writing-board image, to obtain the to-be-processed grayscale image with the board writing being highlighted in grayscale.

5. The method according to claim 1, wherein step of converting, according to the target object segmentation image, the grayscale image of the writing-board image into the to-be-processed grayscale image with the board writing being highlighted comprises:

obtaining a processed grayscale image of the writing-board image according to the target object segmentation image, wherein a grayscale value of the target object in the processed grayscale image of the writing-board image is consistent to a grayscale value of the writing board;

performing morphological closing operation on the processed grayscale image of the writing-board image to obtain a writing-board background grayscale image; and performing image subtraction on the processed grayscale image of the writing-board image and the writing-board background grayscale image to obtain the to-be-processed grayscale image.

6. The method according to claim 5, wherein step of obtaining the processed grayscale image of the writing-board image according to the target object segmentation image comprises:

performing an image operation on the target object segmentation image and the writing-board image to obtain a to-be-processed writing-board image with the target object being identified in grayscale;

performing gray-scaling processing on the to-be-processed writing-board image; and adjusting a grayscale value of the target object, which is obtained after the gray-scaling processing, in the to-be-processed writing-board image as a grayscale value of a writing board, to obtain a processed grayscale image of the writing-board image.

7. The method according to claim 5, further comprising: performing sharpening enhancement and edge smoothing on a character in the image obtained through the image subtraction, and determining the image obtained after the sharpening enhancement and the edge smoothing as the to-be-processed grayscale image.

8. The method according to claim 5, wherein step of performing binarization processing on the to-be-processed grayscale image to obtain the board-writing image of the writing-board image comprises:

determining the binarization threshold value through Otsu method; and performing binarization processing on the to-be-processed grayscale image by using the determined binarization threshold value, to obtain the board-writing image.

9. The method according to claim 1, wherein step of converting, according to the target object segmentation image, the grayscale image of the writing-board image into the to-be-processed grayscale image with the board writing being highlighted comprises:

performing an image operation on the target object segmentation image and the writing-board image to obtain the to-be-processed writing-board image with the target object being identified in grayscale;

performing, according to a color board type of a writing board, grayscale adjustment on the target object in the to-be-processed writing-board image, to obtain a pre-processed image, wherein a contrast ratio between the target object and the board writing pre-processed image reaches a predetermined contrast ratio; and inputting the pre-processed image into a board-writing segmentation model and outputting the to-be-processed grayscale image by using the board-writing segmentation model, wherein the board-writing segmentation model is a neural network with a board-writing segmentation function after training and learning.

10. The method according to claim 9, wherein the board-writing segmentation model is configured to perform following operations:

extracting preliminary feature information from the pre-processed image;

processing the preliminary feature information by using a plurality of expansive convolution layers with different expansive ratios to obtain a plurality of pieces of structure feature information, wherein the plurality of pieces of structure feature information are in one-to-one correspondence with the plurality of expansive convolution layers;

performing information confluence on the plurality of pieces of structure feature information to obtain intermediate information; and performing image reconstruction according to the intermediate information to obtain the to-be-processed grayscale image.

11. The method according to claim 1, further comprising: obtaining an external contact contour of the board-writing image and filling a target region with a writing-board color in the board-writing image, wherein the target region is a region which is located inside the external contact contour and has an area smaller than a preset area.

12. The method according to claim 1, further comprising: performing noise filtering on an edge of the target object in the writing-board image.

13. An electronic device, comprising: a processor, a memory, and a program which is stored in the memory and executable by the processor, wherein when executed by the processor, the program is configured to realize a step of a method according to claim 1.

14. A computer-readable storage medium, which is non-transitory and has a computer program or an instruction stored thereon, wherein when executed by a processor, the computer program or the instruction is configured to realize a step of a method according to claim 1.

* * * * *